United States Patent [19]
Kunze et al.

[11] Patent Number: 5,816,521
[45] Date of Patent: Oct. 6, 1998

[54] MAGNETIC-TAPE-CASSETTE APPARATUS HAVING A DECK FOR MAGNETIC-TAPE CASSETTES

[75] Inventors: Norbert Kunze, Ehringshausen; Dieter Müller, Staufenberg, both of Germany

[73] Assignee: U.S. Philips Corporation, New York, N.Y.

[21] Appl. No.: 706,116

[22] Filed: Aug. 30, 1996

[30] Foreign Application Priority Data

Sep. 2, 1995 [DE] Germany .................. 195 32 524.9

[51] Int. Cl.[6] .................................................. G11B 15/44
[52] U.S. Cl. ................... 242/356; 242/356.5; 242/356.7
[58] Field of Search ................... 242/356, 356.3, 242/356.4, 356.6, 356.7; 360/96.2, 96.3, 96.4

[56] References Cited

U.S. PATENT DOCUMENTS

| | | | |
|---|---|---|---|
| 4,380,031 | 4/1983 | d'Alayer de Costemore d'Arc | 360/74.1 |
| 4,843,499 | 6/1989 | Ogawa | 360/96.3 |
| 5,140,475 | 8/1992 | Tanaka | 360/96.3 |
| 5,276,567 | 1/1994 | Ohashi et al. | 360/96.2 |
| 5,346,156 | 9/1994 | Kunze et al. | 242/356 |
| 5,375,789 | 12/1994 | Kunze et al. | 242/356 |
| 5,450,275 | 9/1995 | Kunze et al. | 242/356 |
| 5,669,570 | 9/1997 | Kunze et al. | 242/356.4 |

Primary Examiner—John P. Darling
Attorney, Agent, or Firm—Steven S. Rubin

[57] ABSTRACT

A magnetic tape cassette apparatus which has a magnetic head switchable between two groups of channels, respectively for forward and reverse play. Music searching, which detects pauses of at least a minimum duration in a group of recording tracks, is operable during fast forward or fast reverse along the track previously selected. In the fast winding mode the switching member for channel group selection is held in the position it occupied prior to actuation of fast winding.

12 Claims, 6 Drawing Sheets

FIG.2  PLAY REV:

FFW from PLAY NOR:

MAGNETIC-TAPE-CASSETTE APPARATUS HAVING A DECK FOR MAGNETIC-TAPE CASSETTES

BACKGROUND OF THE INVENTION

1. Field of the Invention

The invention relates to a magnetic-tape-cassette apparatus comprising a deck for magnetic-tape cassettes, which deck is constructed for play and fast winding operation in a forward and a reverse direction, switching between the forward and the reverse direction being effected by means of a reversing mechanism which reverses the direction of the deck in the play and fast winding modes, comprising a magnetic head which lies against the magnetic tape in the play mode and which has two groups of channels to read recordings in two groups of recording tracks of the magnetic tape, a switching member which can be switched from one state to another in order to activate one group of channels or another group of channels in the magnetic head, a fast winding mechanism comprising at least one fast winding button, a music search circuit adapted to detect a pause of a given minimum duration in one group of recording tracks of the magnetic tape.

2. Description of the Prior Art

In magnetic-tape-cassette apparatuses suitable for operation in a forward and a reverse direction it is customary to switch from one group of channels of the magnetic head to the other group of channels when the play direction is changed. This is not compatible with a music search system which detects pauses between recordings on the magnetic tape during fast reverse or fast forward winding of the tape. In such a system the active channels of the magnetic head should correspond to the selected recording tracks of the magnetic tape regardless of the direction of the magnetic tape in the fast-winding mode.

DE 31 07 626 describes a magnetic-tape-cassette apparatus which solves the problem described above by coupling means for coupling the reversing mechanism for the reversible drive to the switching member and means by which these coupling means are disengageable. However, such solution is very expensive because the coupling means and the disengagement means have to be implemented as additional mechanical components.

SUMMARY OF THE DRAWINGS

It is an object of the invention to provide a magnetic-tape-cassette apparatus of the type defined in the opening paragraph which enables a music search system to be realized with a minimum of additional components and at minimal cost.

According to the invention this object is achieved in that
the switching member has been constructed so as to assume of said states as a preferential position without any external influence,
the reversing mechanism switches the switching member from the preferential position to a secondary position by means of an actuating element upon a change-over from one direction in the play mode to the other direction in the play mode,
the fast winding mechanism comprises a locking element which locks the switching member in the secondary position in the fast winding mode when the switching member occupied the secondary position prior to actuation of the fast winding mechanism.

Figure 1:
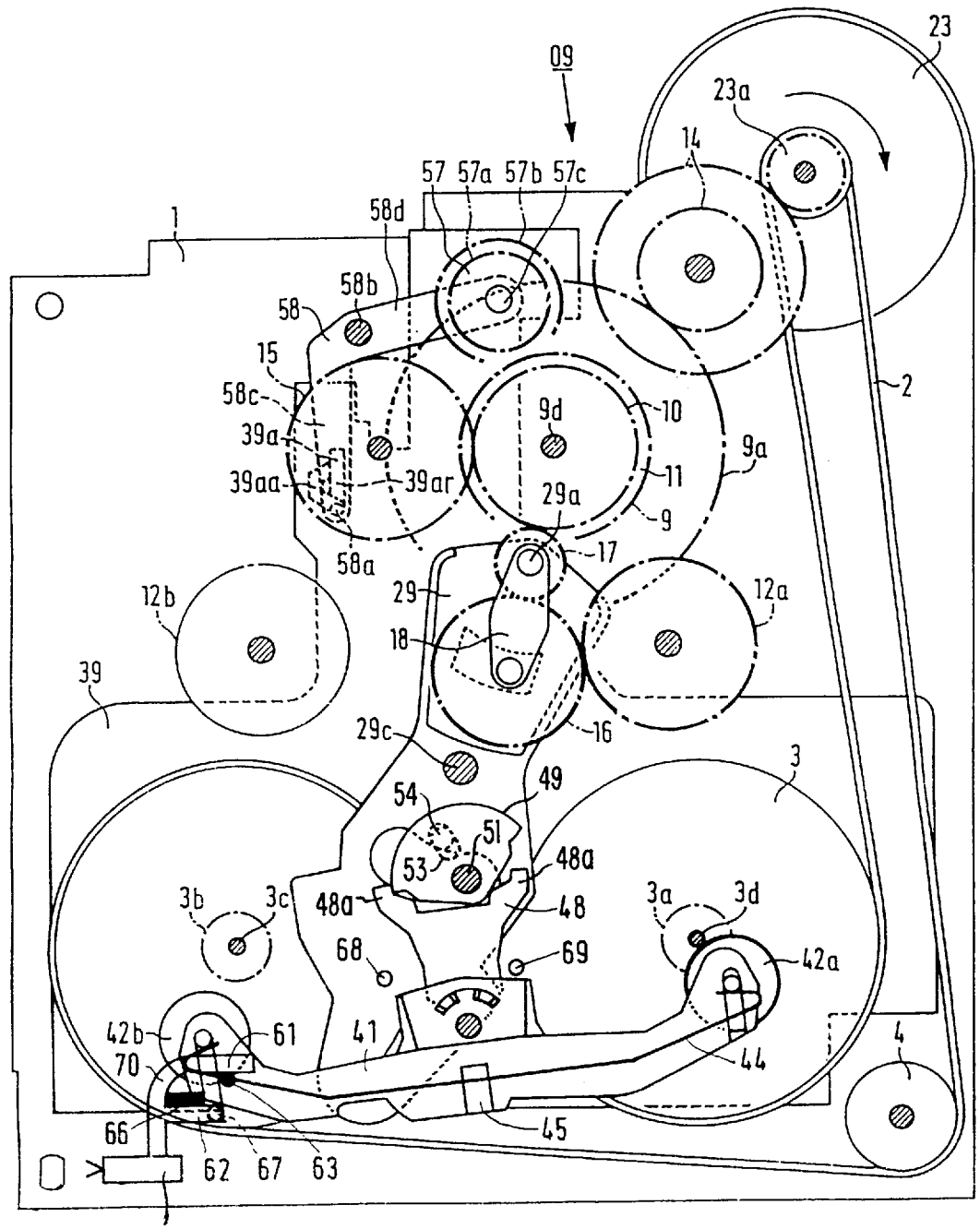

In the preferential position of the switching member one of the two groups of channels is active, for example, the channel group for the forward play direction. When the deck is now switched to the reverse play direction the switching member is switched from the preferential position to the secondary position by means of an actuating element of the reversing mechanism and thereby activates the channel group for the reverse play direction in the magnetic head. The fast winding mechanism is constructed in such a manner that the channel group which was active before actuation of the fast winding mechanism also remains active upon actuation of the fast winding mechanism. For this purpose, the fast winding mechanism comprises a locking element which holds the switching member, when in its secondary position, in this secondary position upon actuation of the fast winding mechanism and thereby prevents the switching member from changing over to the preferential position.

Such an arrangement can be integrated simply and at low cost in a magnetic-tape-cassette apparatus of the type defined in the opening paragraph.

In an embodiment of the invention comprising pressure rollers capable of pressing the magnetic tape against the respective capstan by which the magnetic tape is to be moved, the pressure rollers are supported on a pivotable pressure-roller support common to both rollers, the pressure-roller support is pivoted by means of parts of the reversing mechanism, the actuating element is a projection provided on the pressure-roller support.

If the magnetic-tape-cassette apparatus comprises a pivotable pressure-roller support the switching member can simply be changed over by a projection provided on the pressure-roller support.

In a further embodiment of the invention the switching member comprises a lever having two lever arms, the switching member is switchable from the preferential position to the secondary position in that the actuating element acts upon one of the lever arms, the switching member can be locked in the secondary position in that the locking element acts upon the other lever arm.

The provision of two lever arms enables the actuating element to act upon one lever arm and the locking element to act upon the other lever arm.

In a further embodiment of the invention the locking element is a projection provided on the fast winding button, which projection, upon actuation of the fast winding button, is pressed against one of the lever arms of the switching member and locks it in the secondary position when the switching member occupied the secondary position before the actuation of the fast winding mechanism.

Such a projection can be integrated very simply in an existing fast winding mechanism.

A preferred embodiment of the invention is characterized in that the switching member is urged towards the preferential position by means of a spring.

DESCRIPTION OF THE DRAWINGS

Figure 2:
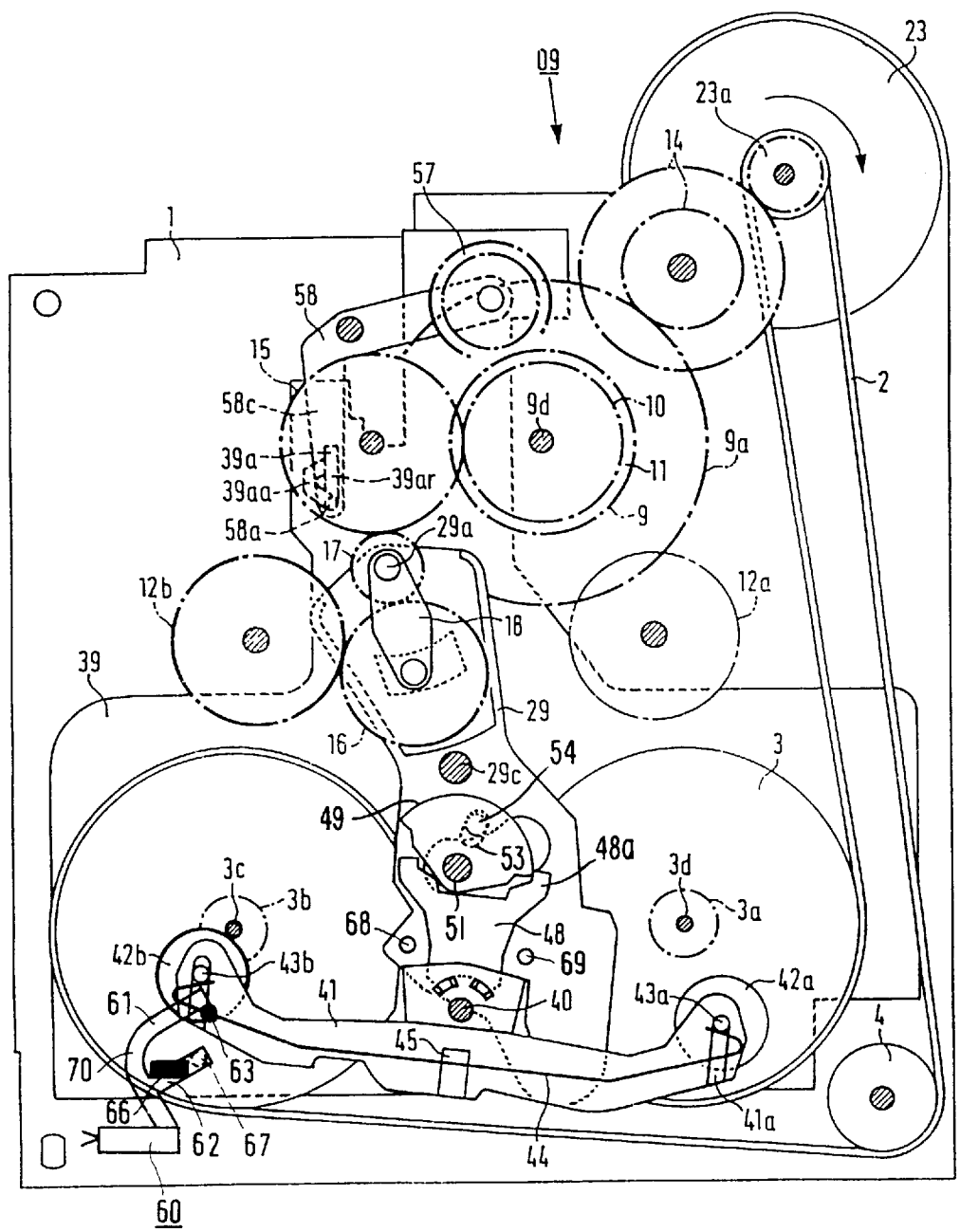
Figure 3:
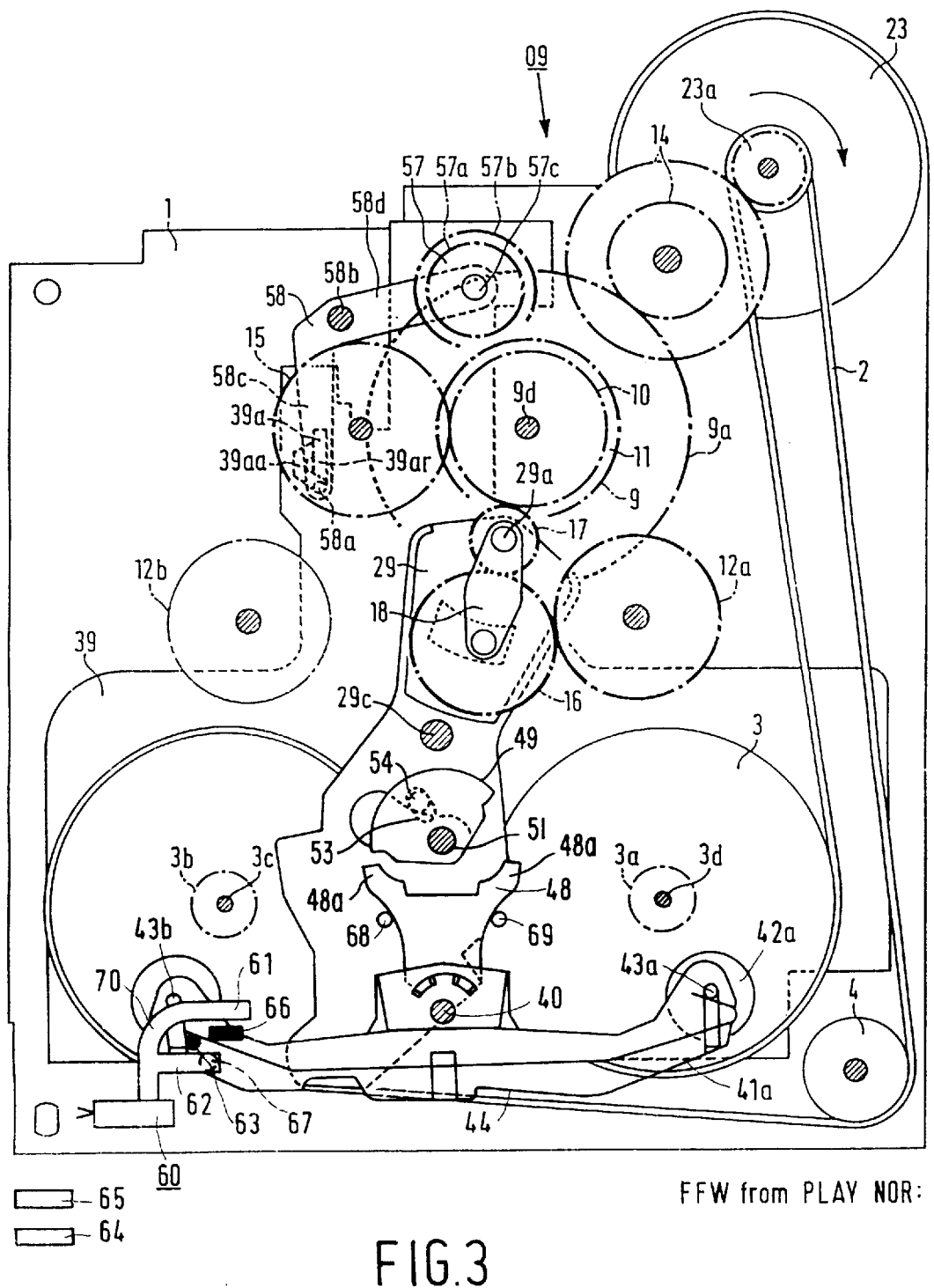
Figure 4:
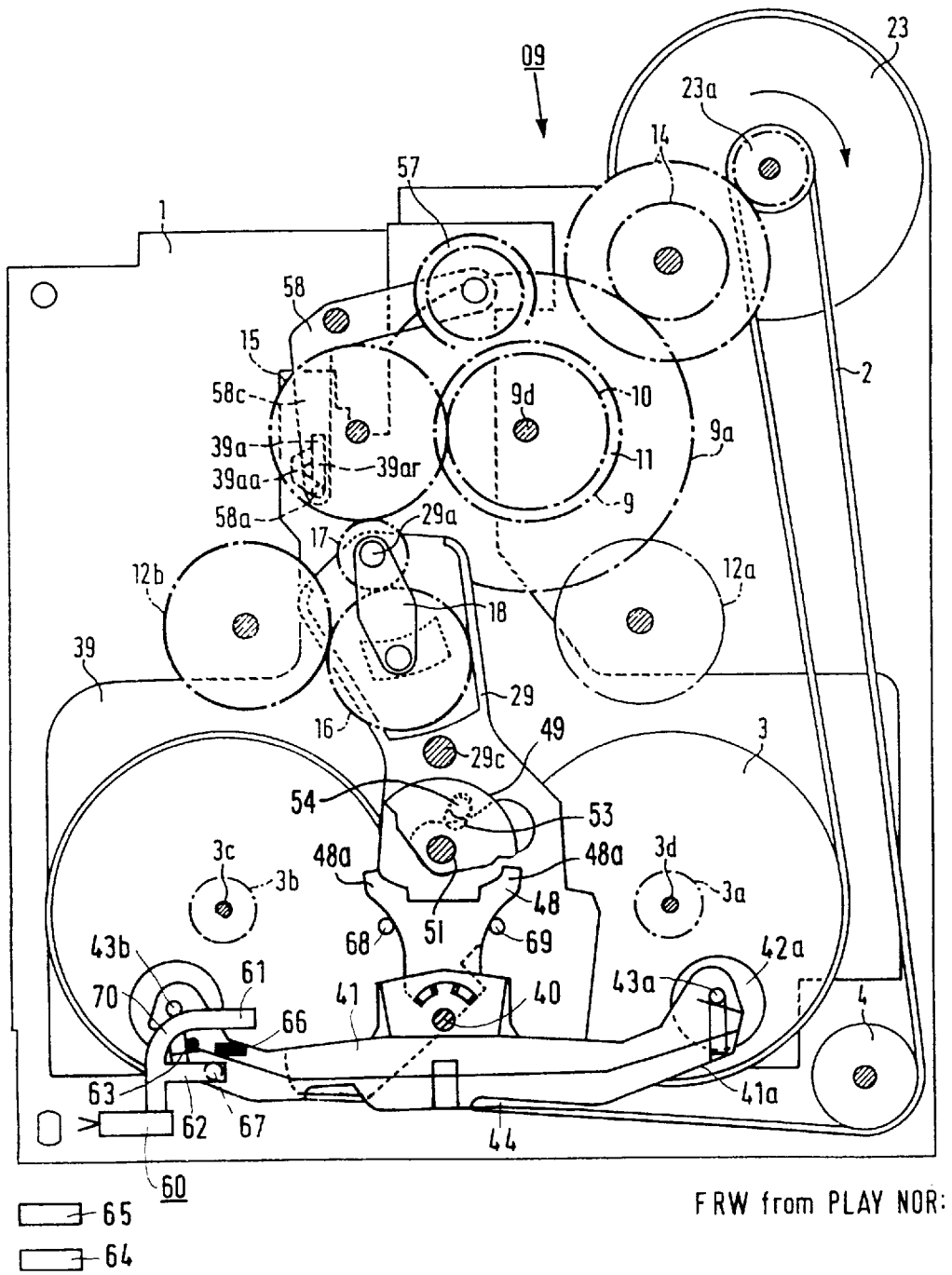
Figure 5:
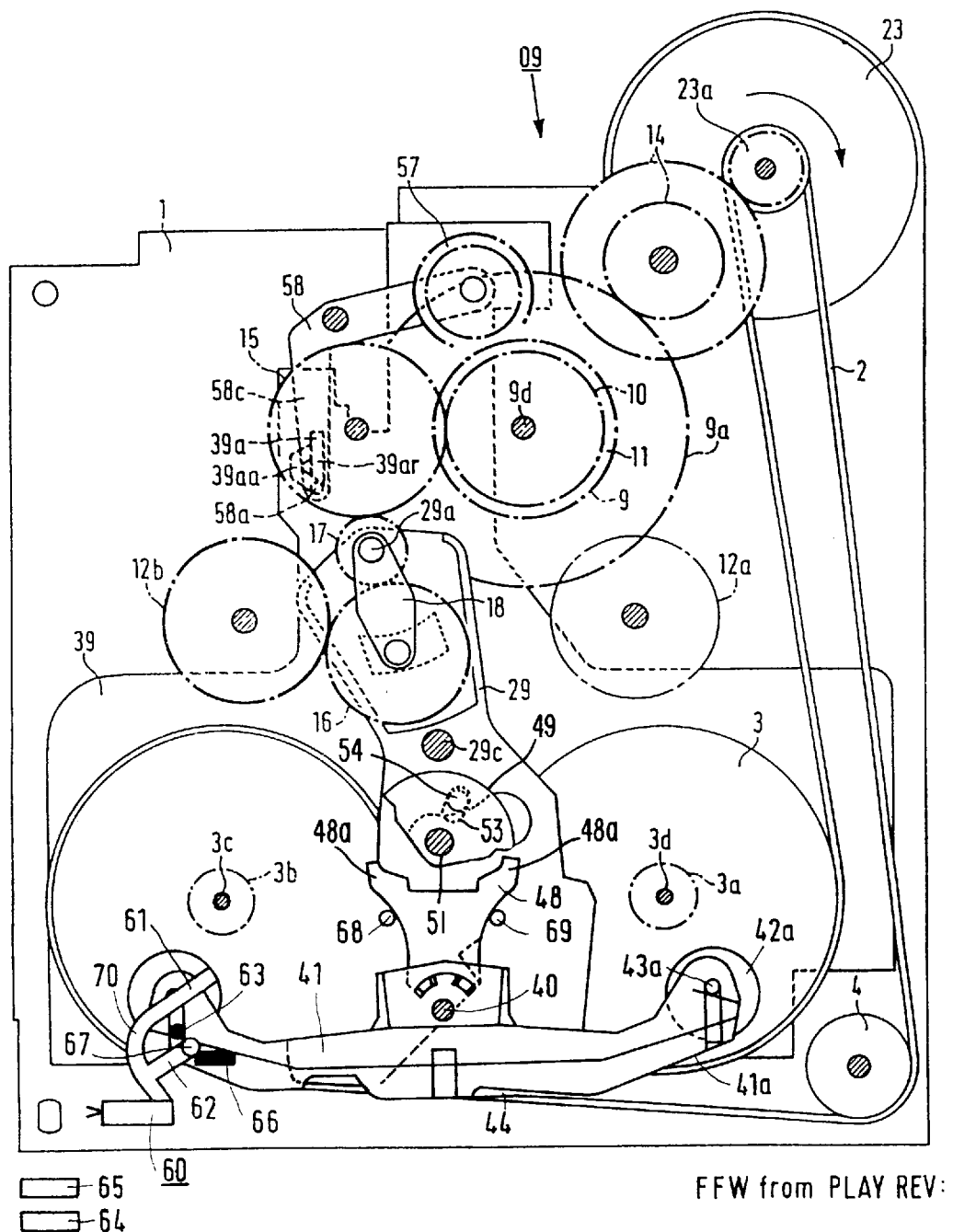
Figure 6:
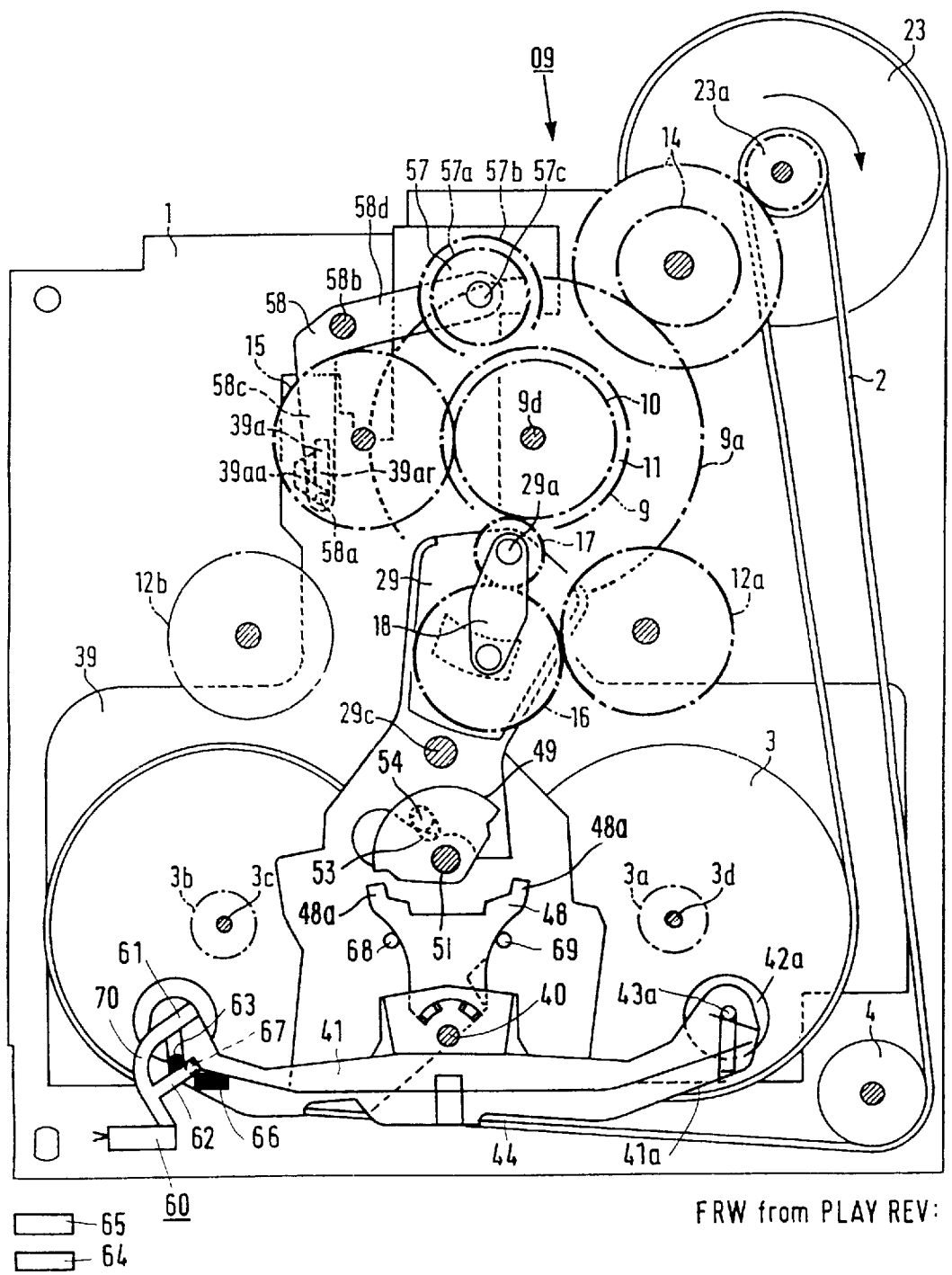

The invention will be described in more detail hereinafter with reference to the drawings. In the drawings:

FIG. 1 shows a deck for magnetic-tape cassettes in a magnetic-tape-cassette apparatus in the forward play direction (NOR), FIG. 2 shows the deck of FIG. 1 in the reverse play direction (REV), FIG. 3 shows the deck of FIG. 1 in the fast forward mode (FFW), the deck having occupied the forward play mode (NOR) prior to actuation of the fast winding mechanism, FIG. 4 shows the deck of FIG. 1 in the fast reverse mode (FRW), the deck having occupied the forward play mode (NOR) prior to actuation of the fast winding mechanism, FIG. 5 shows the deck of FIG. 1 in the fast forward mode (FFW), the deck having occupied the reverse play mode (REV) prior to actuation of the fast winding mechanism, FIG. 6 shows the deck of FIG. 1 in the fast reverse mode (FRW), the deck having occupied the reverse play mode (REV) prior to actuation of the fast winding mechanism.

DESCRIPTION OF THE PREFERRED EMBODIMENT

FIGS. 1 to 6 show on a chassis 1 how the movable parts of the deck are driven in various operating positions. A non-reversible motor 23 drives flywheels 3 for the capstan 3c for reverse play (REV) and for the capstan 3d for forward play (NOR) in opposite directions by means of a belt 2. The capstans 3c, 3d have teeth 3a and 3b. The belt 2 is guided over a deflection roller 4.

A winding mechanism 09, which is also driven by the motor 23, serves for driving a forward reel disc 12a for the forward play mode (NOR)and a reverse reel disc 12b for the reverse play mode (REV). For this purpose, the shaft 23a of the motor 23 drives the play coupling with a toothed drive ring 9a of a primary coupling wheel 9 via an intermediate drive wheel 14, which primary coupling wheel is rotated continuously about a shaft 9d as long as the motor shaft 23a rotates. The primary coupling wheel 9 drives a secondary coupling wheel 10, which is concentric with the former, via a friction coupling 11. This coupling may be a wrap spring coupling, a felt coupling or an electromechanical coupling.

The secondary coupling wheel 10 is in mesh with an intermediate wheel 17, which is rotatable about a spindle 29a of a switching lever 29. The switching lever 29, which can occupy an end position for forward operation (NOR) or an end position for reverse operation (REV) and is which is fixed in these positions, is urged clockwise in FIGS. 1, 3 and 6 and counterclockwise in FIGS. 2, 4 and 5. The toothed wheel 17 meshes with a toothed wheel 16 which is mounted for rotation on a pivotal arm 18, which is in mesh with the NOR reel disc 12a in the situation shown in FIGS. 1, 3 and 6.

The meshing forces act on the individual toothed wheels and the pivotal arm 18 in such a manner that the pair NOR reel disc 12a/ pivotal wheel 16 is engaging and the pair secondary coupling wheel 10/intermediate wheel 17 is disengaging. In the NOR position shown in FIG. 1 the switching lever 29 is urged clockwise by a switching-lever spring, not shown. The spring load is such that the switching lever 29 is urged to the right, i.e. in a clockwise direction, towards the NOR reel disc 12a against the opposing meshing forces.

The winding mechanism 09 includes a toothed double bypass wheel 57 whose spindle 57a is mounted on a two-arm bypass-wheel lever 58 which is pivotable about a spindle 58b. The bypass wheel 57 can be made to engage with or be disengaged from the primary coupling wheel 9 and the secondary coupling wheel 10 in such a manner that coupling 11 is bypassed in the case of engagement and the coupling is operative in the case of disengagement. By means of this bypass wheel 57 the NOR and REV reel discs 12a, 12b can be switched to a higher speed for the purpose of fast winding. In order to obtain the higher fast-winding speed the transmission ratio is selected in such a manner that the number of teeth of the primary coupling wheel 9 is larger than the number of teeth of the secondary coupling wheel 10 and that the number of teeth of the bypass wheel 57, which is in mesh with the toothed wheel 9, is smaller than the number of teeth of the bypass wheel 57b, which is in mesh with the secondary coupling wheel 10. The winding mechanism 09 further includes a reverse wheel 15, which is constantly in mesh with the secondary coupling wheel 10. This reverse wheel 15 can drive the REV reel disc 12b via the intermediate wheel 17 and the pivotal wheel 16 in the reverse mode as illustrated in FIG. 2.

One arm of the two-arm bypass lever 58 carries the bypass wheel 57 and the other arm 58c of the bypass lever 58 carries an actuating pin 58a, which engages in a guide contour 39a of the head support 39. This guide contour comprises a guide contour 39a formed as an endless guide path having a steeply rising left-hand path section 39aa bending to the left in the drawings and a linear straight return path section 39ar, the two sections being interconnected at their ends. The actuating pin 58a can move around in the guide contour 39a. When the head support 39 is moved from the play position into the fast winding position the actuating pin 58a will traverse the left-hand path section 39aa, the actuating pin 58a being pulled to the left and the bypass wheel 57 being pivoted against the primary and the secondary coupling wheel 9 and 10. If the head support remains in this position the bypass wheel 57 will couple the primary and the secondary coupling wheels 9, 10 to one another. Since the transmission from the primary coupling wheel 9 to the secondary coupling wheel 10 via the bypass wheel has been selected in such a manner that the secondary coupling wheel can rotate with a higher speed, this arrangement enables a rapid rotation of the reel discs 12a, 12b to be obtained. This rapid rotation may be fast forward winding (FFW) or fast reverse winding (FRW).

Whereas FIG. 1 represents the play mode in the forward direction FIG. 2 represents the play mode in the reverse direction (REV). FIG. 2 shows that the switching lever 29, which is pivotable about the spindle 29c, has been pivoted counterclockwise. In this position the intermediate wheel 17 is in mesh with the reverse wheel 15. Thus, the REV reel disc 12b is driven in the REV direction by the motor 23 via the motor shaft 23a, the intermediate drive wheel 14 and the drive ring 9a of the primary coupling wheel 9, which rotates constantly in the same direction, i.e. clockwise. The primary coupling wheel 9 drives the secondary coupling wheel 10 via the friction coupling 11. In its turn, the secondary coupling wheel 10 drives the reverse wheel, which then rotates the REV reel disc 12b clockwise via the intermediate wheel 17 and the pivotal wheel 16.

In the present case of REV operation the meshing forces on the individual toothed wheels and the pivotal arm 18 act in such a manner that the pair REV reel disc 12b/pivotal wheel 16 is engaging and the pair REV wheel 15/intermediate wheel 17 is disengaging. The switching lever 29 is urged counterclockwise by the switching-lever spring. The spring load is then so high that the switching lever 29 is urged to the left, i.e. in a counterclockwise direction against the opposing meshing forces.

In the REV play mode shown in FIG. 2 the bypass wheel 57 is disengaged from the primary coupling wheel 9 and the secondary coupling wheel 10, so that both coupling wheels are coupled only via the coupling 11, i.e. with a possibility of slipping.

To change from the one play direction in FIG. 1 to the other play direction in FIG. 2 the drive must be reversed.

This reversing is effected automatically during a play mode or fast-winding mode when the tape transport stops when the end of the tape is reached. However, reversal is also possible by pressing a button.

The deck comprises a head support 39 carrying a magnetic head, not shown. A pressure-roller support 41 is pivotably mounted on a spindle 40 of the head support 39 symmetrically relative to the capstans 3c, 3d. The pressure-roller support 41 extends from the spindle 40 towards the capstans 3c, 3d to both sides; it has a U-shaped profile with a rear wall and two flange plates. At its longitudinal ends the pressure-roller support 41 has slots 41a and 41b in the flange plates, in which slots the end portions 43a and 43b of the spindle 43 of pressure rollers 42a, 42b are disposed each at s 41a and 41b are disposed each at one side of a respective spring arm 44a and 44b of a pressure spring 44.

The pressure spring 44 comprises a hoop-steel strip; it is only secured in its center in a clamping element 45 and at its ends it is split to form the fork-shaped spring arms 44a/b.

In the slots 41a and 41b the pressure rollers 42a/b are urged towards the capstans 3c and 3d by means of the spring arms 44a/b of the pressure spring. The spring arms 44a, 44b thus press individually against the spindle end portions 43a, 43b and thereby align the pressure rollers 42a, 42b. The pressure at the free ends of the spring arms 44a/b, are obtained by bending these free ends back so to form hooks, which stiffens the pressure portions of the spring arms 44a/b.

The pressure roller support 41 carries a fork 48 which extends between the capstans 3c, 3d and is directed towards the spindle 29c of the switching lever 29. The fork tines 48a cooperate with an actuating lever 49, which has sliding edges 50 which can slide along the fork tines 48a in order to pivot the pressure-roller support 41 into the predetermined pivotal position. The actuating lever 49 is pivotable about a pivot 51 on the chassis. The actuating lever 49 further has a slot 53, through which a pin 54 of the switching lever 29 extends.

In the situation shown in FIG. 1 the pressure roller 42a presses against the capstan 3d. The pressure roller 42d is clear of the capstan 3c. When the switching lever 29 is pivoted counterclockwise the actuating lever 49, moved along by the switching lever 29, is also pivoted counterclockwise via the pin 54, and the sliding edge 50 is pressed against the right-hand fork tine 48a. As a result of this, the pressure roller 42a is disengaged from the capstan 3d and the pressure roller 42b is applied to the capstan 3c.

When an auto-reverse deck changes over between a forward play direction and a reverse play direction the magnetic head must be switched from the channel group for the forward play direction to the channel group for the reverse play direction. This is effected by means of a track switch 60 comprising a lever 70 having a first lever arm 61 and a second lever arm 62. The track switch 60 is electrically connected to the magnetic head, not shown, of the magnetic-tape-cassette apparatus. The track switch has two switch positions, a preferential position and a secondary position. The lever arm 62 carries a pin 67 at its end.

In the situation for the forward play direction as shown in FIG. 1 the track switch 60 occupies a preferential position. In this preferential position the magnetic-head channels for the forward play direction are active. The track switch 60 always occupies the preferential position when no external influence acts upon the lever arms 61 and 62. This can be achieved in that the track switch 60 is urged towards the preferential position by a spring, not shown.

For the change-over of the track switch 60 the pressure-roller support 41 carries a projection 63. When the deck is changed over from the forward play direction illustrated in FIG. 1 to the reverse play direction illustrated in FIG. 2, the pressure-roller support 41 is pivoted clockwise, the pressure roller 42a is disengaged from the capstan 3d, and the pressure roller 42b is applied to the capstan 3c. During this pivotal movement of the pressure-roller support 41 the projection 63 is pressed against the lever arm 61 of the track switch 60 and sets it from the preferential position to the secondary position. In this secondary position the magnetic-head channels for the reverse play direction are activated via the track switch 60.

In order to enable the magnetic-tape-cassette apparatus to be used in conjunction with a music search system (MSS), which detects pauses between recordings on the magnetic tape, it must be ensured that the active channels of the magnetic head correspond to the selected tracks on the magnetic tape regardless of the transport direction of the magnetic tape during fast winding. When in the forward play mode the fast winding mechanism for fast forward winding is activated by pressing the fast-forward button 64, the head support 39 is moved from the play position into the fast-winding position, and the NOR reel disc 12a, as already described hereinbefore, is switched to fast winding by means of the bypass wheel 57. Together with the head support 39 the spindle 40, about which the pressure-roller support 41 is pivotable, is also pressed into the fast-winding position. In this fast winding position the position of the fork 48 and hence that of the pressure-roller support 41 is no longer dictated by the fork 48. Instead, the actuating lever 48 is pressed against two guide elements 68 and 69 on the chassis when the head support 39 returns into the fast-winding position. The guide elements 68 and 69 are so disposed that fork 48 and, as a consequence, the pressure-roller support 41 assume a position in which the pressure rollers 42a and 42b are substantially equispaced relative to the capstans 3d and 3c, respectively. This position of the pressure-roller support 41 is illustrated in FIG. 3. This Figure shows that the projection 63 of the pressure-roller support 41 is clear of the lever arm 61 of the track switch 60. Actuation of the fast winding mechanism for fast forward winding, starting from the forward play direction, will not change the position of the track switch 60 and, as a result of this, the desired magnetic-head channels for forward play remain active. In a manner not shown, pressing the fast-forward button 64 causes a projection 66 to be moved towards the track switch 60. The function of this projection 66 will be explained later on. When the fast-forward button 64 is pressed in the forward play mode the projection 66 will be positioned between the lever arms 61 and 62 of the track switch 60. Thus, the projection 66 does not influence the switch position of the track switch 60.

When the fast-reverse button 65 is actuated in the forward play mode the deck should be reversed, i.e. the toothed wheel 16 should be moved from the reel disc 12a to the reel disc 12b by a pivotal movement of the switching lever 29 in the counterclockwise direction. By means of the bypass wheel 57 the reel disc 12b is then switched to rapid rotation for the purpose of fast winding. The head support 39 is moved from the play position into the fast winding position and the fork 48 is pressed against the guide elements 68 and 69. As a result of this, the pressure roller support 41 assumes a position in which the pressure rollers 42a and 42b are spaced at substantially equal distances from the capstans 3d and 3c, respectively. This position of the pressure roller support 41, as shown in FIG. 4, corresponds substantially to that of the pressure roller support 41 as shown in FIG. 3. The lever arm 61 of the track switch 60 is not actuated by the projection 63 of the pressure-roller support 41 and the switch position of the track switch 60 is not changed. Consequently, the magnetic-head channels for the forward play direction remain active. When the fast reverse button 65 is pressed the projection 66 is moved towards the track switch 60 in a manner not shown. This projection 66 is positioned between the lever arms 61 and 62 of the track switch 60 and, as a result, it does not influence the position of the track switch 60.

In the reverse play mode the track switch 60 is in the secondary position and, consequently, the magnetic-head channels for the reverse play direction are active. These channels for the reverse play direction should remain active when the fast winding mechanism is actuated for the purpose of music search. When the fast forward button 64 is actuated in the reverse play mode the REV reel disc 12b is switched to rapid rotation for the purpose of fast winding by means of the bypass wheel 57. The head support 39 is moved back from the play position into the fast winding position and the fork 48 is pressed against the guide elements 68 and 69. As is shown in FIG. 5, the pressure-roller support 41 assumes a position, corresponding to that in FIGS. 3 and 4, in which the pressure rollers 42a and 42b are spaced at substantially equal distances from the capstans 3d and 3c, respectively. When the head support 39 and, as consequence, the pressure-roller support 41 return from the play position into the fast-winding position the projection 63, which has been pressed against the lever arm 61 of the track switch 60 in the play position in the reverse play mode and thus locks this switch in the secondary position, is disengaged from the lever arm 61 of the track switch 60. Since the track switch 60 is urged towards the preferential position by a spring, not shown, this switch, if no further steps were taken, would be set from the secondary position to the preferential position and would activate the channel group for the forward play direction in the magnetic head. In order to preclude this, the projection 66 is moved towards the track switch 60 when the fast forward button 64 is pressed. This projection 66 is then positioned underneath the lever arm 62 of the track switch 60 and acts upon the pin 67 of the lever arm 62, thus locking the track switch 60 in the secondary position. If the projection 63 is disengaged from the lever arm 61 when the head support 39 returns from the play position into the fast winding position, the pin 67 of the lever arm 62 is pressed against the projection 66 in a direction towards the preferential position under the influence of the spring load and thereby prevents the track switch 60 from being switched from the secondary position to the preferential position. Thus, if in the reverse play direction the fast forward mode is selected the magnetic-head channels for the reverse play direction remain active and the music search system can detect the pauses on the magnetic tape in the desired manner.

If in the reverse play mode the fast reverse button 65 is actuated the deck should be reversed, i.e. the toothed wheel 16 should be switched from the reel disc 12b to the reel disc 12a by a pivotal movement of the switching lever 29 in the clockwise direction. By means of the bypass wheel 57 the NOR reel disc 12a is then switched to fast rotation for the purpose of fast winding. When the head support 39 moves from the play position to the fast winding position the fork 48 is pressed against the guide elements 68 and 69 and, as shown in FIG. 6, the head support 41 assumes the position already described with reference to FIGS. 3, 4 and 5. During the movement of the head support 39 the projection 63 of the switching lever 41 is disengaged from the lever arm 62 of the track switch 60, which was held in the secondary position by the projection 63 in the reverse play direction. However, when the fast reverse button 65 is pressed the projection 66 is moved towards the track switch 60 in a manner not shown, so as to be positioned underneath the lever arm 62 of the track switch 60. If the projection 63 is now disengaged from the lever arm 61, the pin 67 of the lever arm 62 is pressed against the projection 66 in a direction towards the preferential position under the influence of the spring load and keeps the track switch in the secondary position. As a result of this, the magnetic-head channels for the reverse play direction remain active and the music search system can detect the pauses on the magnetic tape in the desired manner.

We claim:

1. A magnetic-tape-cassette apparatus comprising a deck for magnetic-tape cassettes, which deck is constructed for play and fast winding operation in a forward and a reverse direction, switching between the forward and the reverse direction being effected by means of a reversing mechanism which reverses the direction of the deck in the play and fast winding modes, comprising:

a magnetic head which lies against the magnetic tape in the play mode and which has two groups of channels to read recordings in two groups of recording tracks of the magnetic tape, a switching member which can be switched from one state to another in order to activate one group of channels or another group of channels in the magnetic head, a fast winding mechanism comprising at least one fast winding button and, a music search circuit adapted to detect a pause of a given minimum duration in one group of recording tracks of the magnetic tape, wherein:

the switching member has been constructed so as to assume one of said states as a preferential position without any external influence, the reversing mechanism switches the switching member from the preferential position to a secondary position by means of an actuating element upon a change-over from one direction in the play mode to the other direction in the play mode and, the fast winding mechanism comprises a locking element which locks the switching member in the secondary position in the fast winding mode when the switching member occupied the secondary position prior to actuation of the fast winding mechanism.

2. A magnetic-tape-cassette apparatus as claimed in claim 1, comprising pressure rollers capable of pressing the magnetic tape against the respective capstan by which the magnetic tape is to be moved, wherein: the pressure rollers are supported on a pivotable pressure-roller support common to both rollers, the pressure-roller support (41) is pivoted by means of parts of the reversing mechanism, the actuating element is a projection provided on the pressure-roller support.

3. A magnetic-tape-cassette apparatus as claimed in claim 2, wherein:

the switching member comprises a lever having a first and second lever arm, the switching member is switchable from the preferential position to the secondary position in that the actuating element acts upon the first lever arm, and the switching member can be locked in the secondary position in that the locking element acts upon the second lever arm.

4. A magnetic-tape-cassette apparatus as claimed in claim 3, wherein:

the locking element is a projection provided on the fast winding button, which projection, upon actuation of the fast winding button, is pressed against one of the lever arms of the switching member and locks it in the secondary position when the switching member occupied the secondary position before the actuation of the fast winding mechanism.

5. A magnetic-tape-cassette apparatus as claimed in claim 4, wherein:

the switching member is urged towards the preferential position by means of a spring.

6. A magnetic-tape-cassette apparatus as claimed in claim 3, wherein:

the switching member is urged towards the preferential position by means of a spring.

7. A magnetic-tape-cassette apparatus as claimed in claim 2, wherein:

the switching member is urged towards the preferential position by means of a spring.

8. A magnetic-tape-cassette apparatus as claimed in claim 1, wherein:

the switching member comprises a lever having a first and second lever arm, the switching member is switchable from the preferential position to the secondary position in that the actuating element acts upon the first lever arm, and, the switching member can be locked in the secondary position in that the locking element acts upon the second lever arm.

9. A magnetic-tape-cassette apparatus as claimed in claim 8, wherein:

the locking element is a projection provided on the fast winding button, which projection, upon actuation of the fast winding button, is pressed against the second lever arm of the switching member and locks it in the secondary position when the switching member occupied the secondary position before the actuation of the fast winding mechanism.

10. A magnetic-tape-cassette apparatus as claimed in claim 9, wherein:

the switching member is urged towards the preferential position by means of a spring.

11. A magnetic-tape-cassette apparatus as claimed in claim 8, wherein:

the switching member is urged towards the preferential position by means of a spring.

12. A magnetic-tape-cassette apparatus as claimed in claim 1, wherein:

the switching member is urged towards the preferential position by means of a spring.

* * * * *